(12) United States Patent
Gildersleeve et al.

(10) Patent No.: US 11,767,212 B2
(45) Date of Patent: Sep. 26, 2023

(54) PACKET OPENING AND DISCHARGING DEVICE AND METHOD OF USING

(71) Applicant: H.J. Heinz Company Brands LLC, Pittsburgh, PA (US)

(72) Inventors: Madison Kay Gildersleeve, Vadnais Heights, MN (US); Michelle Marie Hayden, San Francisco, CA (US); Peter Dalton, Orangeburg, NY (US); Ladd Peterson Rowe, Lake Como, NJ (US); John Parker, Monmouth, NJ (US); Leeya Jackson, Minneapolis, MN (US); Chase Zreet, Boulder, CO (US); Farin Nikdel, New York, NY (US); Funmilayo Danielle Adejobi, Jamaica, NY (US); Felipe Ribeiro Dos Santos, Sao Paulo (BR)

(73) Assignee: H.J. Heinz Company Brands LLC, Pittsburgh, PA (US)

( * ) Notice: Subject to any disclaimer, the term of this patent is extended or adjusted under 35 U.S.C. 154(b) by 164 days.

(21) Appl. No.: 17/395,064

(22) Filed: Aug. 5, 2021

(65) Prior Publication Data
US 2023/0044330 A1     Feb. 9, 2023

(51) Int. Cl.
*B67D 1/00*     (2006.01)
*B67D 1/08*     (2006.01)
(Continued)

(52) U.S. Cl.
CPC ......... *B67D 1/0809* (2013.01); *A47G 19/183* (2013.01); *A47J 47/01* (2013.01); *B67D 1/0001* (2013.01); *B67D 1/0004* (2013.01)

(58) Field of Classification Search
CPC .................................................. B67D 1/0001
See application file for complete search history.

(56) References Cited

U.S. PATENT DOCUMENTS

| 2,717,103 A | 9/1955 | Hill |
| 5,382,106 A | 1/1995 | Voigt |

(Continued)

OTHER PUBLICATIONS

Product 1 believed to be publicly available at least as of Oct. 14, 2020, 1 page.

(Continued)

*Primary Examiner* — Jeremy Carroll
(74) *Attorney, Agent, or Firm* — FITCH, EVEN, TABIN & FLANNERY LLP

(57) ABSTRACT

Apparatuses and methods are provided herein useful to open and discharge the contents of a packet or sachet. In some embodiments, a portable dispensing device includes a housing, an opening mechanism, and a discharging mechanism. In some configurations, the device includes a rotatable axle, a rotatable cap disposed at an end of the housing, and a roller element (coupled to the axle) that is configured to rotate with manual rotation of the rotatable cap, and a slot in the housing that permits at least a portion of the packet to advance through, wherein the slot and housing assists with pressing opposing packet walls together to discharge the contents of the packet. In some configurations, the opening mechanism also includes another housing slot where a corner of the packet may be fed and a knife element disposed to facilitate removal of the corner to thereby open the packet.

21 Claims, 11 Drawing Sheets

(51) Int. Cl.
*A47G 19/18* (2006.01)
*A47J 47/01* (2006.01)

(56) References Cited

U.S. PATENT DOCUMENTS

| | | | |
|---|---|---|---|
| D369,051 S | 4/1996 | Marcoux | |
| 5,884,812 A | 3/1999 | Stawowski | |
| 6,196,420 B1* | 3/2001 | Gutierrez | B67D 7/0216 222/101 |
| 6,247,618 B1 | 6/2001 | Liberatore | |
| 11,096,529 B1 | 8/2021 | Cotner | |
| 2007/0029343 A1* | 2/2007 | Sanfilippo | A47G 19/183 222/102 |
| 2009/0064503 A1* | 3/2009 | Young | B26B 13/18 30/298.4 |
| 2010/0083794 A1* | 4/2010 | Galpin | B67B 7/24 81/3.4 |
| 2013/0119103 A1* | 5/2013 | Mango | B60R 11/00 224/400 |
| 2021/0039873 A1* | 2/2021 | Ackerman | B65D 83/0072 |

OTHER PUBLICATIONS

Product 10 believed to be publicly available at least as of Oct. 14, 2020, 1 page.
Product 11 believed to be publicly available at least as of Oct. 14, 2020, 1 page.
Product 12 believed to be publicly available at least as of Oct. 14, 2020, 1 page.
Product 13 believed to be publicly available at least as of Oct. 14, 2020, 1 page.
Product 14 believed to be publicly available at least as of Oct. 14, 2020, 1 page.
Product 15 believed to be publicly available at least as of Oct. 14, 2020, 1 page.
Product 2 believed to be publicly available at least as of Oct. 14, 2020, 1 page.
Product 3 believed to be publicly available at least as of Oct. 14, 2020, 1 page.
Product 4 believed to be publicly available at least as of Oct. 14, 2020, 1 page.
Product 5 believed to be publicly available at least as of Oct. 14, 2020, 1 page.
Product 6 believed to be publicly available at least as of Oct. 14, 2020, 1 page.
Product 7 believed to be publicly available at least as of Oct. 14, 2020, 1 page.
Product 8 believed to be publicly available at least as of Oct. 14, 2020, 1 page.
Product 9 believed to be publicly available at least as of Oct. 14, 2020, 1 page.
Design U.S. Appl. No. 29/802,510, filed Aug. 5, 2021, entitled "Packet Roller".

* cited by examiner

PACKET OPENING AND DISCHARGING DEVICE AND METHOD OF USING

TECHNICAL FIELD

This disclosure relates generally to mechanical implements including those for facilitating access to contents in containers, packets, or sachets.

BACKGROUND

Packaging for food, including sauces and condiments, has evolved over the years. While sauces and condiments were initially displayed and sold in basic glass jars and bottles, these items were eventually provided in packaging that was made from synthetic plastic materials. These containers have been used for a variety of condiments, such as, e.g., ketchup, mustard, mayonnaise, barbeque sauce, and the like. Eventually, the packaging concepts turned to providing packaging suitable for individual portions of the condiments.

Individual packaging for condiments has, itself, seen changes. At one time, the packaging was simply an empty cup that could be filled with a condiment from a large capacity condiment dispenser that may, for example, have included a pump or other suitable dispensing device. For many years, condiments have been available in individual portion packets or sachets which seal the condiment between a pair of generally planar sheets of material. See, for example, U.S. Pat. Nos. 3,164,695, 3,315,801 and 9,061,796. One or more weakened zone may be provided to simplify the act of opening the packet to access the condiment contained therein.

Various changes to the packets or sachets themselves are often expensive or unduly complicated. Thus, an improvement to the way users interact with (e.g., opening and dispensing the contents from a packet) are of interest to users, especially those who are high volume users of such packets or sachets.

BRIEF DESCRIPTION OF THE DRAWINGS

The above needs are at least partially met through provision of the packet opening and discharging device and method of using described in the following detailed description, particularly when studied in conjunction with the drawings, wherein.

Figure 1:
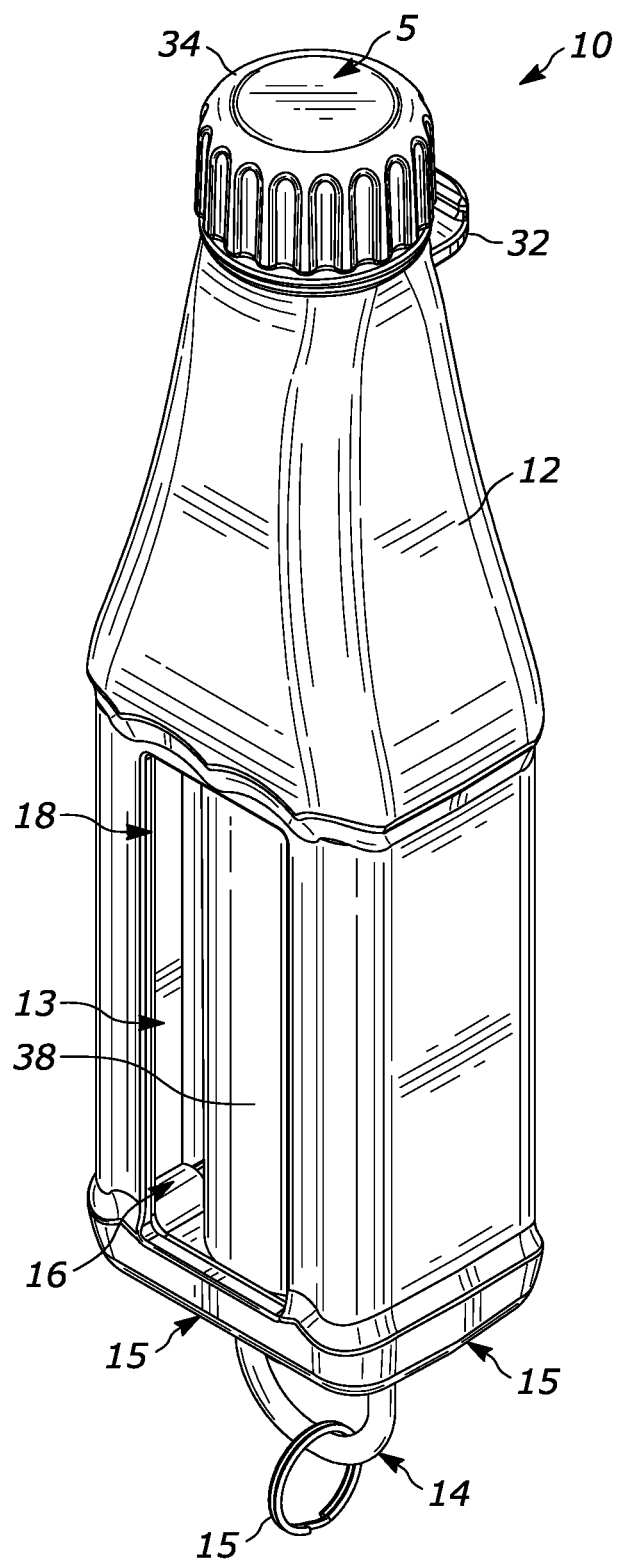
FIG. 1 comprises an upper perspective view of one embodiment.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, described herein are systems, methods, and apparatus that are useful for accessing and dispensing a fluid, such as a condiment, from a packet, pouch, or sachet. Some embodiments include a portable device with a housing, an opening mechanism for opening the packet, and a dispensing mechanism for dispensing product or contents from a pouch or sachet. In some configurations, the opening mechanism includes an opening slot in the housing that permits a corner of a packet or pouch to be fed therethrough and a knife or cutting implement disposed at an end of the opening slot to facilitate removal of the corner of the packet to thereby open the packet, providing easy access to the contents that may flow out of the packet opening. In some embodiments, the opening slot is disposed on a movable compartment panel or door that opens to expose a refuse chamber, where the corners that have been removed from associated packets are retained. After opening one or more packets, a user may grasp a latch to remove the movable compartment panel or door from a remainder of the device to thereby remove the separated corner(s) that have been retained in the refuse chamber.

In addition to the opening mechanism, the portable device also may have a dispensing mechanism that facilitates evacuation or dispensing of contents from the packet or pouch. In some embodiments, the dispensing mechanism includes an axle extending a portion of a length of the housing, a rotatable cap coupled to the axle and disposed at a first end of the housing, a roller element disposed at least partially in the housing, coupled to the axle, and configured to rotate with manual rotation of the rotatable cap, and a discharge slot through a housing wall where a packet may be at least partially advanced therethrough to facilitate evaluation or discharge of its contents. By some approaches, the discharge slot is disposed adjacent the roller element to thereby permit a packet to advance or be pulled into the interior chamber of the housing, where the discharge slot and the roller element cooperate to push the contents out of the packet.

In one illustrative embodiment, the roller element includes a lengthwise slit that is configured to receive an edge of the packet that is fed through the discharge slot in the housing. By some approaches, the slit is narrow enough such that it retains the edge as the roller element and the lengthwise slit are rotated around the axle. By retaining the edge of the packet as the roller element and lengthwise slit are rotated around the axle, the packet is pulled inward at least partially through the discharge slot and into the interior of the housing. As the packet is pulled through the discharge slot, the sides of the packet are pressed inward via sidewalls of the discharge slot in the housing, to thereby discharge or evacuate the contents of the packet.

To facilitate easy use of the dispensing mechanism, the rotatable cap may include a textured outer surface and indicia. In use, the textured outer surface may improve a user's manual grasp on the rotatable cap. Further, in some configurations the indicia may be aligned with the longitudinal slit, such that a user may align the visible indicia on the rotatable cap with the discharge slot to align the longitudinal slit with the discharge slot. This alignment permits a user to feed a packet through the discharge slot and easily engage with the longitudinal slit.

In one illustrative embodiment, the portable device is sized to open and evacuate condiment packets that have a length of about 2-4 in. and a width of about 1-3-in. such that the device is about 7-in. or less in height. Further, in some configurations, the portable device has a ketchup bottle-shaped configuration or profile, to thereby identify how user might effectively use the various implements of the portable device. In addition, in some configurations, the portable device has a housing and/or a roller element comprised of a red colored plastic resin. In other configurations, the housing and/or roller element may be comprised of a yellow mustard color or other condiment-colored plastic resin.

While condiment bottles are popular at home, consumers often utilize smaller condiment packets on-the-go and away from home. Accordingly, in some configurations, the portable device includes a keychain for easy and convenient transportation and retention of the portable device.

These and other benefits may become clearer upon making a thorough review and study of the following detailed description. Referring now to the drawings, and in particular to FIG. 1, an illustrative portable device 10 for discharging or evacuating product or contents from a packet is shown. The contents may include, for example, ketchup, mustard, barbeque sauce, mayonnaise, hot sauce, or other condiments or sauces from a condiment packet, pouch, sachet, or similar small bag or flexible container. In some embodiments, the portable device 10 includes a housing 12 forming an at least partially hollow interior chamber 13. In addition, as noted above, the portable device 10 may include a loop 14 for attaching a keyring 15 thereto. The keyring 15 may include an additional circular metal ring which may be used to secure keys thereto.

In some configurations, the housing 12 has a roller element 38 at least partially disposed within the interior chamber 13 formed via the housing 12. As shown in FIG. 1, the roller element 38 is disposed lengthwise along the housing 12. By one approach, the roller element 38 is rotatably coupled to a rotatable cap 34, which is disposed at a first end 5 of the housing 12. In this manner, manual rotation of the rotatable cap 34 translates into rotation of the roller element 38 inside the housing 12.

In some embodiments, the portable device 10 includes an opening mechanism and a dispensing mechanism. By some approaches, the dispensing mechanism includes a discharge or first slot 22 through a wall 44 of the housing 12. When assembled, the first slot 22 is typically disposed adjacent the roller element 38. Thus, a packet may ingress through the first slot 22, engage the roller element 38, and be pulled further through the first slot 22 once the roller element 38 is rotated via the rotatable cap 34.

Further, in some embodiments, the roller element 38 includes a lengthwise slit 50 therein that is sized to receive an edge of a packet and retain the edge therein as the roller element 38 and the lengthwise slit 50 are rotated such that the packet is at least partially pulled into the interior of the housing through the first slot 22. In operation, when the packet is at least partially pulled into the interior of the housing, the opposing side edges of the packet are pressed toward one another via sidewalls 52 of the first slot 22 to thereby evacuate or discharge contents of the packet.

Figure 2:
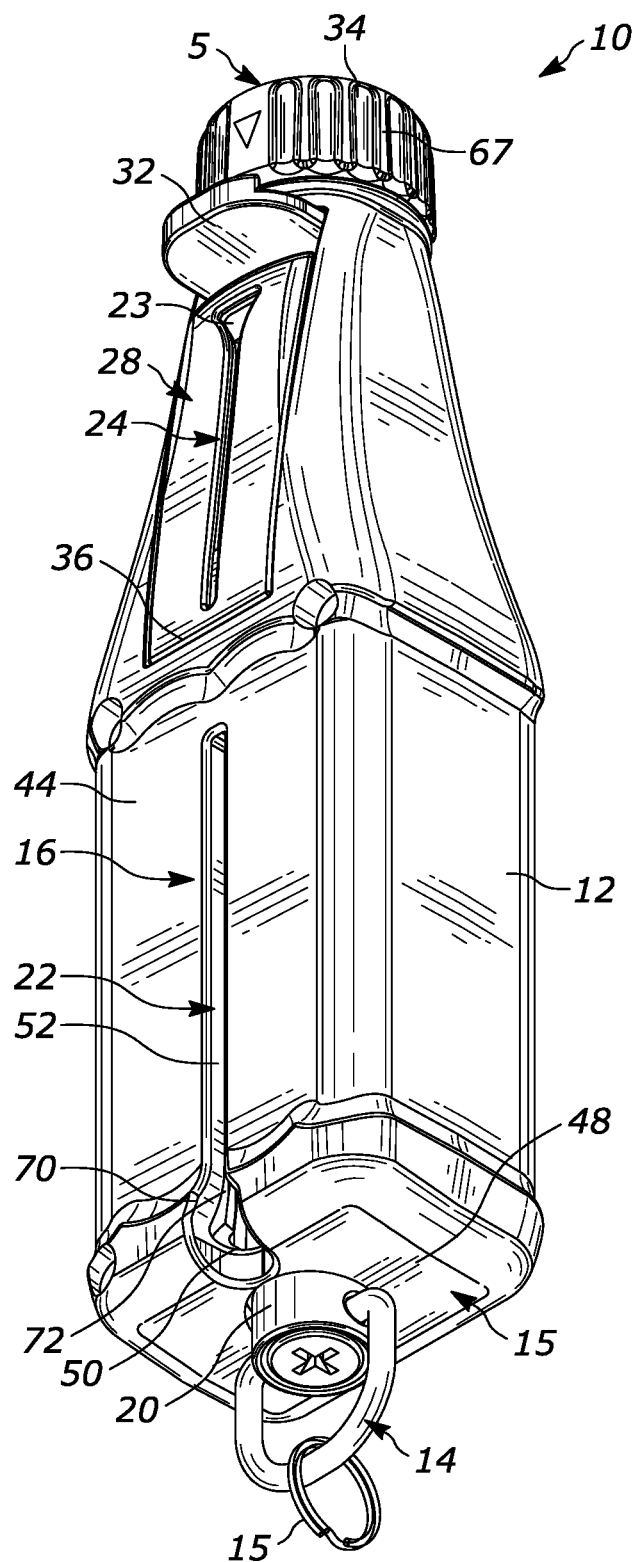
FIG. 2 comprises a lower perspective view of the embodiment of FIG. 1.
Figure 3:
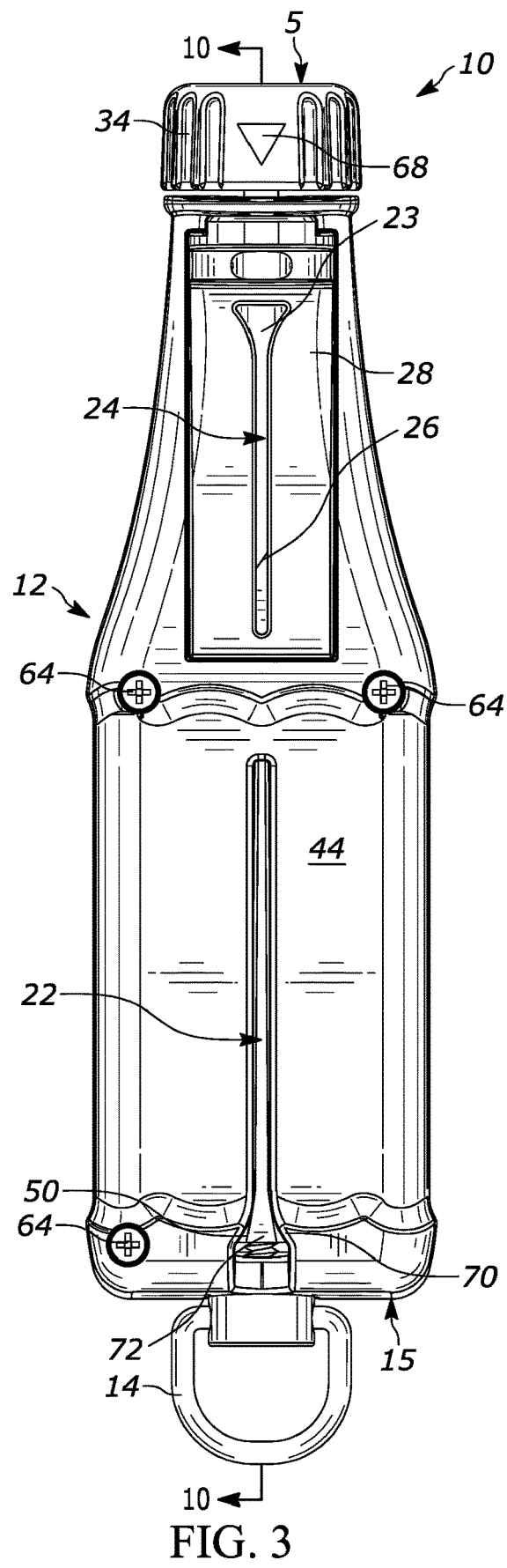
FIG. 3 comprises a front view of FIG. 1.
Figure 4:
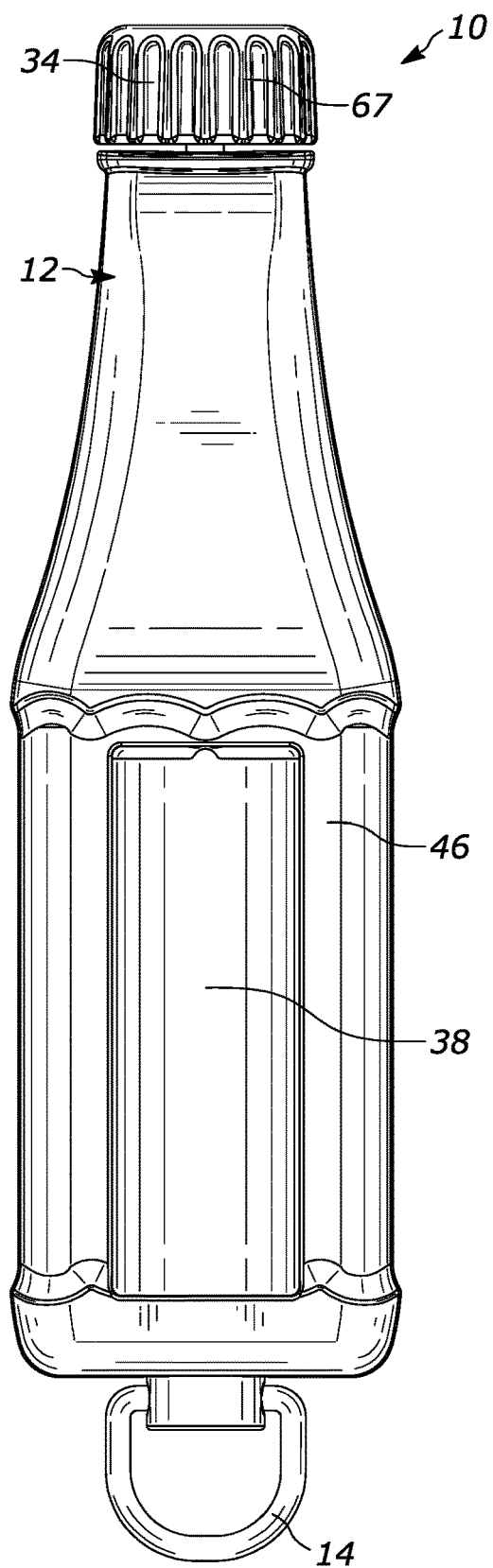
FIG. 4 comprises a rear view of FIG. 1.

As shown in FIGS. 2 and 3, the end of the discharge or first slot 22 adjacent the second end 15 of the housing 12 may have an expended section or flared walls that increase a width of the slot. A similar flared wall or expanded section may be formed in the lengthwise slit 50. Indeed, in some configurations, the first slot 22 includes an expanded end 70 adjacent the second end 15 of the housing 12 and the lengthwise slit 50 in the roller element 38 includes an expanded end 72 adjacent the second end 15 of the housing 12. By some approaches, the first slot 22 extends from the first wall 44 of the housing, over a lower edge of the housing 12, and onto an end wall 48. In this manner, a user may not only feed an edge of a packet through the slot 22 in a manner perpendicular to the slot 22, the user also may advance a side edge of the packet into engagement with the slot 22 in a manner parallel to lengthwise direction of the slot 22. For example, a user may advance or move the packet upward through the expanded opening end 70 of the first slot 22 and/or the expanded opening end 72 of the lengthwise slit 50.

In some embodiments, the portable device has a height from the rotatable cap 34 to the base of the keyring of about 7-in. or less. In one illustrative approach, the portable device has a height of about 6-in. Further, the housing 12 may have a height of about 5.0-in. or less. In one exemplary embodiment, the housing 12 has a height of about 4.88-in. By some approaches, the roller element and the exit opening have a length of about 2-in. or less. In one exemplary embodiment, the roller element 38 is about 1.63-in. long. Further, by one approach, the slit includes a depression or opening in the roller element that is less than 0.0625-in. wide and extends much of the length of the roller element. Accordingly, in some embodiments, the lengthwise slit is less than 1.63-in. long. By having a long and thin opening in the roller element 38 that forms the lengthwise slit, the roller element 38 grasps the edge of the packet and pulls the packet at least partially through the first slot 22.

Figure 5:
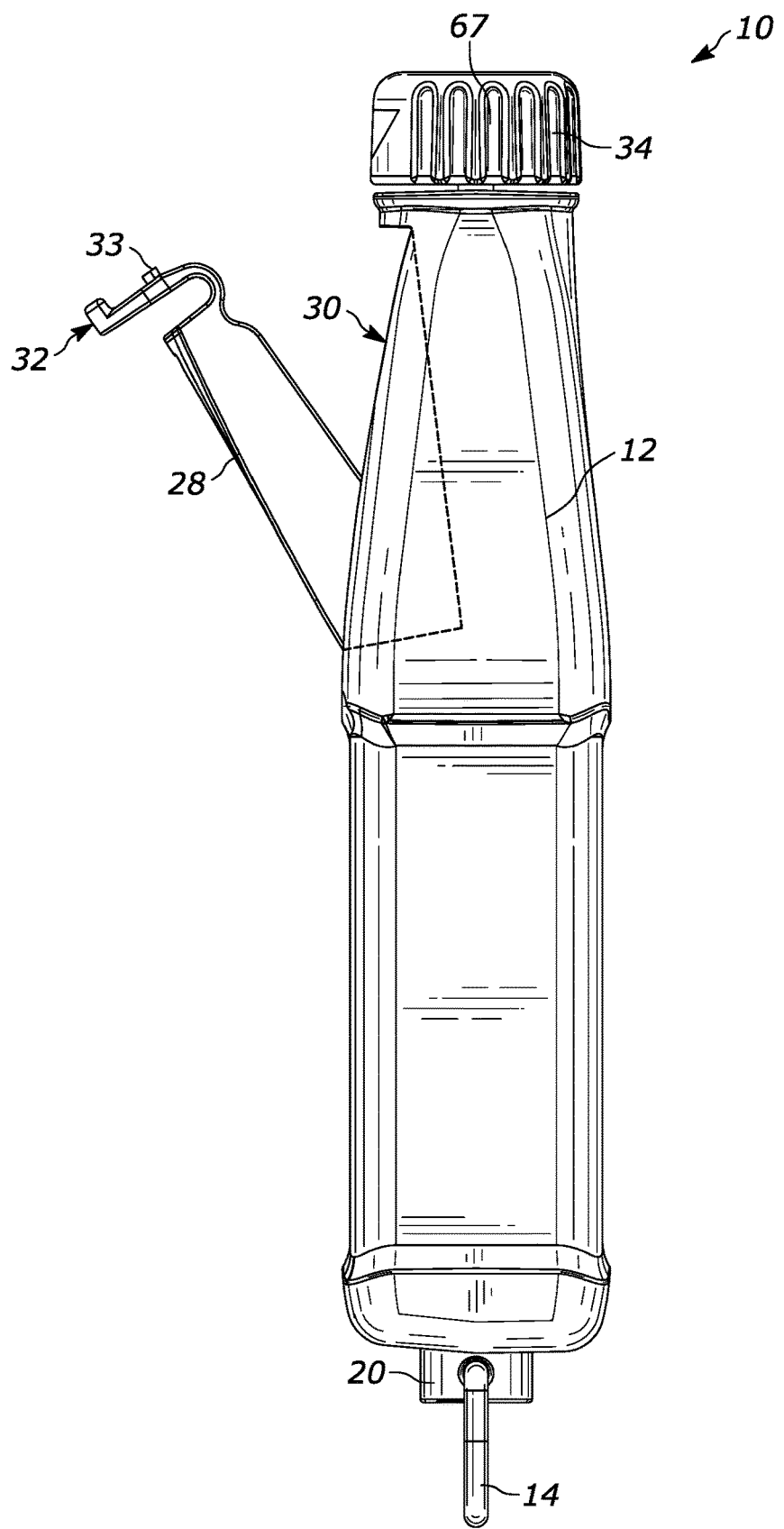
FIG. 5 comprises a side view of the embodiment of FIG. 1, with the device in the open configuration.

In some configurations, an opening mechanism of the portable device 10 includes a movable door or panel 28 with a second slot 24 disposed therein. In operation, the movable panel 28 is configured to be manually moved from a close position (FIG. 6) to an open position (FIG. 5) to expose a refuse chamber 30. By some approaches, the second slot 24 has a knife or cutting element 26 disposed at an end thereof. In use, a user may advance or feed a corner of a packet through the slot 24 and pull downward on the packet to force the packet into engagement with the knife 26 to thereby remove the corner of the packet, which is then retained in the refuse chamber 30.

In some configurations, the lower end of the movable panel 28 is hingedly attached to the remainder of the housing 12, such as, for example, via a thin portion of plastic resin or a portion of plastic that is scored to permit two portions of the housing to move relative to one another. In yet another configuration, the movable panel 28 includes a completely separable panel piece, which may employ one or more mechanical connectors to secure the separable panel piece with a reminder of the housing 12.

By one approach, the movable panel 28 includes a grip, ledge, or graspable thumb tab 32. In some configurations, such a grasping surface permits a user to manually move or rotate the movable compartment panel 28 outward from a remainder of the housing 12 to expose the refuse chamber 30. Further in some approaches, the graspable thumb tab 32 is adjacent a latch or peg that selectively secures the movable compartment panel 28 in a closed configuration relative to a remainder of the housing 12. In use, a user may manually press or grab the graspable thumb tab 32 to disconnect the latch and move the movable compartment panel 28 outward from the remainder of the housing to expose the refuse chamber 30. Once the refuse chamber 30 is exposed, a user may remove any packet corner portions disposed therein.

The movable panel 28 may be retained into position relative to the housing 12 via a variety of connection mechanisms, such as, magnetic or mechanical connections including, for example a friction fit, a snap fit, interference fit, or another similar mechanical connection. By one approach, the movable compartment panel 28 is separable from a remainder of the housing 12 and includes via one or more extensions or pegs at one end thereof and the graspable thumb tab 32 at an opposing end thereof.

Figure 6:
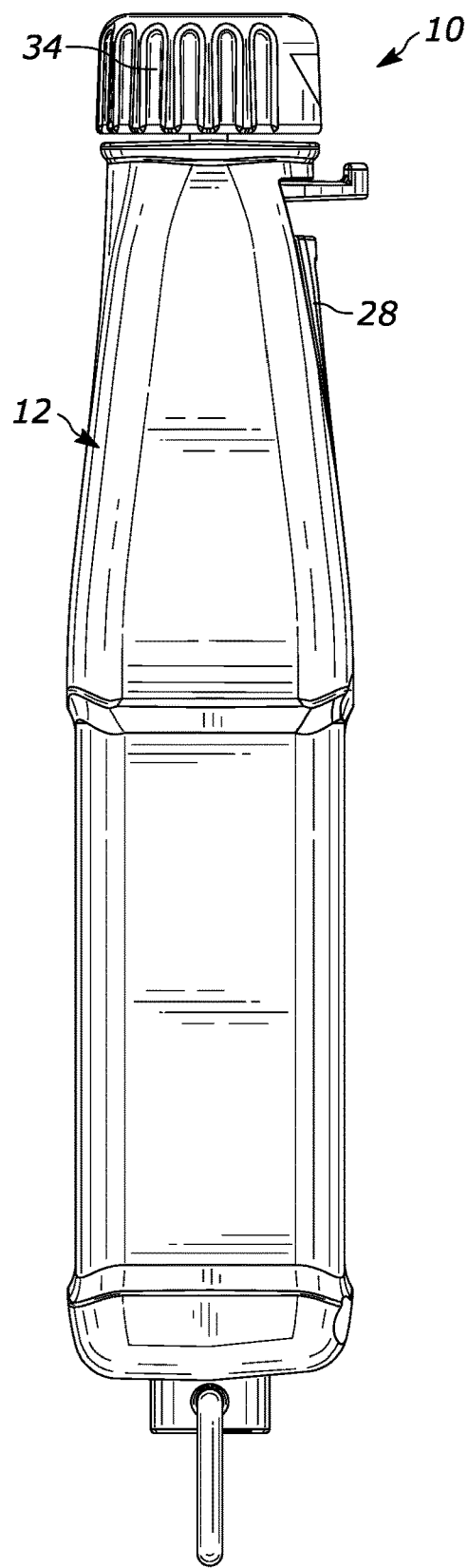
FIG. 6 comprises an opposite side view of the embodiment of FIG. 1, with the device in the closed configuration.
Figure 7:
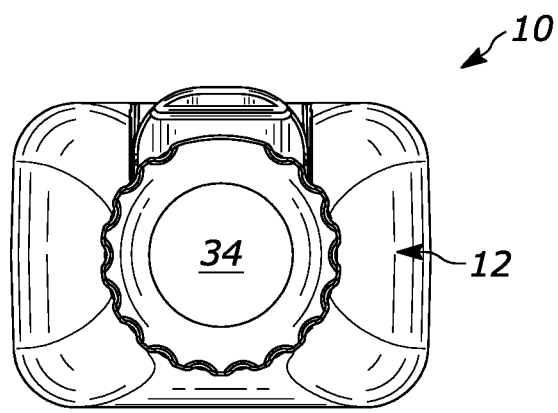
FIG. 7 comprises a top view of the embodiment of FIG. 1.
Figure 11:
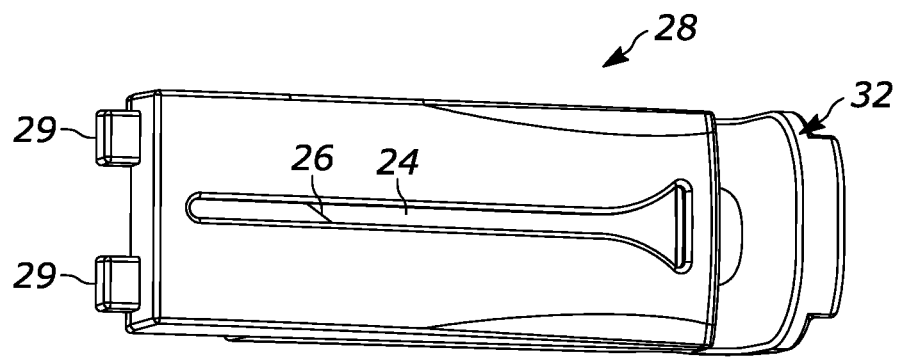
FIG. 11 is a top view of a portion of the embodiment of FIG. 1.
Figure 12:
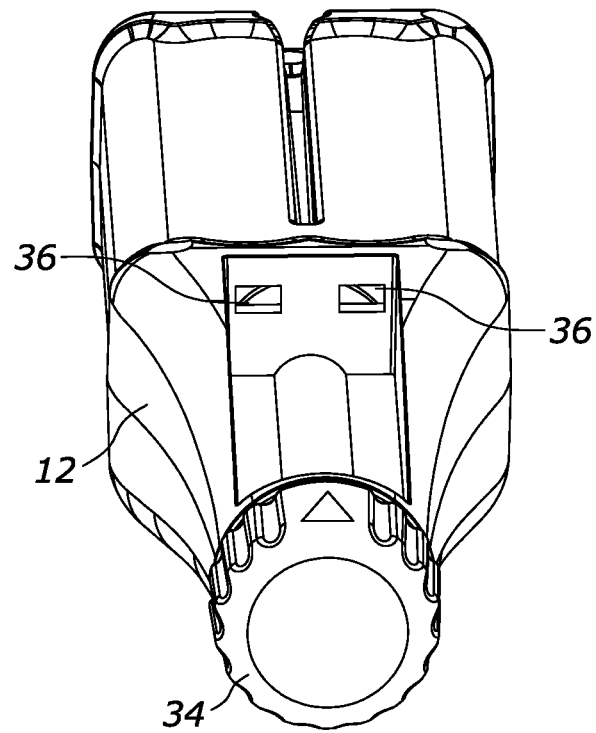
FIG. 12 is a partial perspective view of a portion of the embodiment of FIG. 1

More particularly, in one exemplary configuration illustrated in FIGS. 11 and 12, the movable panel 28, includes two pegs 29 extending from an end thereof, a second slot 24, and the graspable thumb tab 32 at another end thereof. In operation, the pegs 29 are configured to engage corresponding openings 36 (FIG. 12) in the housing 12. In addition, the graspable thumb tab 32 and associated projection 33 (FIG. 5) deflect downward toward the pegs 29 to permit the movable panel 28 to be moved into position in the housing 12 and affixed into the closed position (FIG. 6). The projection 33 is configured to engage a corresponding opening in the housing 12 and the pegs 29 engage the openings 36 (FIG. 12) to securely retain the movable panel 28 relative to the housing.

Further, after the opening mechanism has been used to open a condiment packet, a user may press downward on the graspable thumb tab 32 to disengage the projection 33 from the housing 12 and rotate open the movable panel 28 outward to expose the refuse chamber 30 and remove any portion of the packets that may have been removed from a remainder of the packet.

Figure 9:
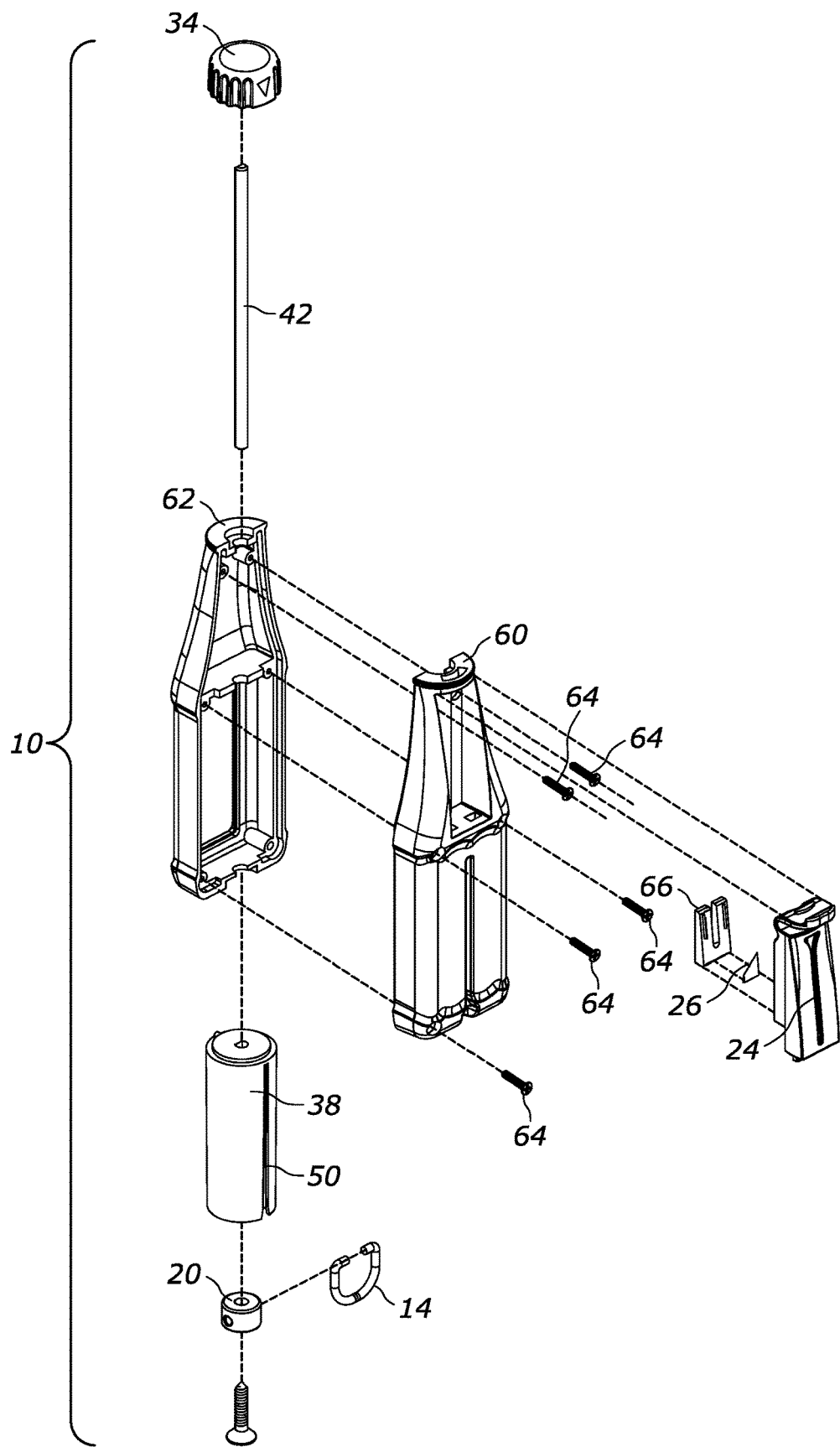
FIG. 9 comprises an exploded perspective view of the embodiment of FIG. 1.

As mentioned above, in some configurations, the opening mechanism includes a cutting implement or knife 26. FIG. 9 illustrates how the knife 26 is secured to a remainder of the movable panel 28 by a rear securement piece 66 that is welded onto the rear of the knife 26.

As illustrated in FIGS. 1-6, in one configuration, the rotatable cap 34 includes a textured peripheral surface 67 formed of depressions, undulations, or another regular or irregular pattern in the exterior surface of the rotatable cap 34. By one approach, the textured surface 67 permits the rotatable cap 34 to be more easily grasped manually to rotate the rotatable cap and the roller element 38 coupled thereto.

As shown in FIG. 3, the rotatable cap 34 also may include indicia 68 thereon for identifying where the lengthwise slit 50 is located on the roller element 38. The indicia 68 may include, for example, an arrow, star, letter, shape, or another visual element. To align the lengthwise slit 50 with the slot 22, a user may align the more easily visually identifiable indicia 68 disposed on the rotatable cap with the slot 22.

Once the lengthwise slit 50 is aligned with the slot 22, a packet may be advanced through the slot 22 and into engagement with the slit 50, which may then be rotate around the axle 42 to pull the packet at least partially into the housing 12.

The rotatable cap 34, roller element 38, housing 12, and/or axle 42 also may include a detent mechanism or notch to assist with aligning and retaining the first slot 22 with the lengthwise slit 50 of the roller element 38. By one approach, a notch is disposed on at least one of the axle 42, the roller element 38, the housing, or the rotatable cap 34 and a bulge corresponding to the notch is disposed on another of the axle, roller element, or rotatable cap to bias or retain the roller element 38 into position such that the lengthwise slit 50 is in alignment with the first slot 22.

Figure 10:
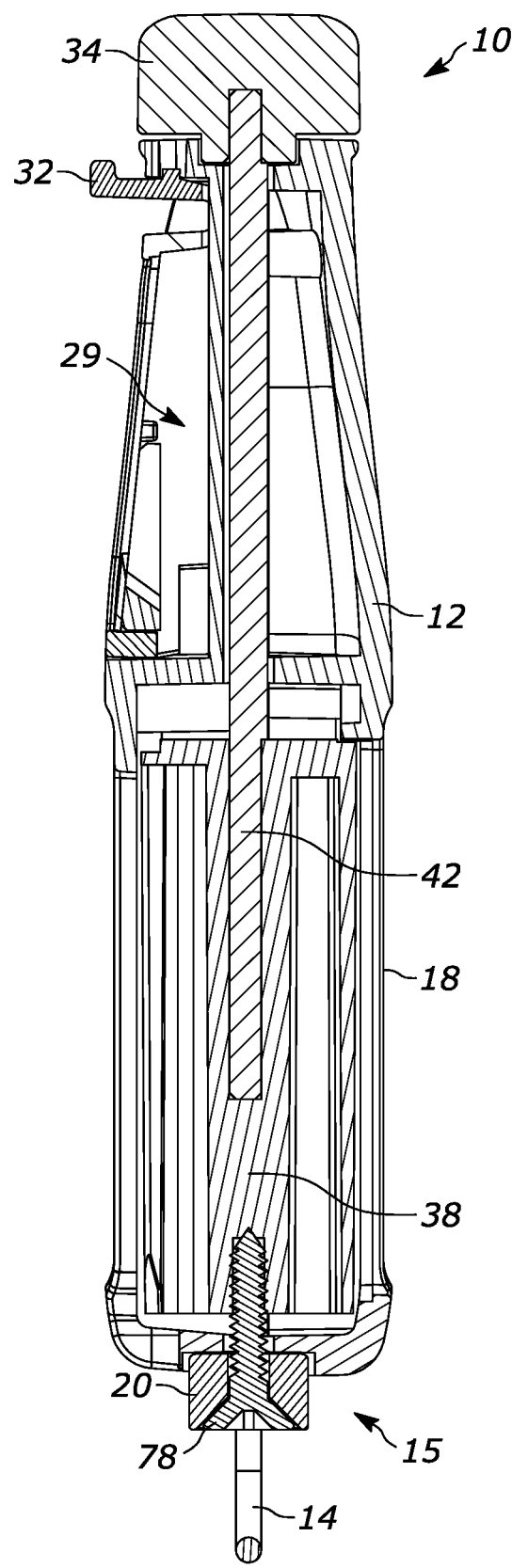
FIG. 10 comprises a cross sectional along line 10-10 identified in FIG. 3.

FIG. 10 illustrates a cross sectional view of the portable device 10. In some illustrative embodiments, the portable device 10 includes an axle 42 that is disposed along a length of the housing. By one approach, the axle 42 is coupled to the rotatable cap 34 adjacent a first end 5 of the portable device 10, and the axle 42 also is coupled to the roller element 38, such that rotation of the rotatable cap 34 induces rotation of the roller element 38. The rotatable cap 34 may be secured to the axle 42 by a variety of mechanical connecting means as are known in the art.

At a second end 15 of the portable device 10, a screw 78 securely couples the housing 12 to the roller element 38 through a collar element, end cap, or bushing 20. The bushing 20 has an annular opening therethrough sized to receive the screw 78 therethrough, which extends from the bushing 20 through the housing 12 into the roller element 38. In this manner, rotation of the rotatable cap 34, axle 42, and roller element 38 also results in rotation of the bushing 20 and the screw 78.

As noted above, in some configurations, rotation of the rotatable cap 34 rotates the roller element 38 via the axle 42. In one illustrative approach, the axle 42 has a non-circular cross section and the roller element 38 has a corresponding non-circular aperture therein (see, e.g., FIG. 9). In one illustrative approach, the non-circular aperture is disposed along an entire length of the roller element 38 permitting the axle 42 to extend therein such that the axle 42 and the roller element 38 are couple to one another in light of the secure fit between the non-circular cross section of the axle and the corresponding non-circular aperture of the roller element.

FIG. 9 illustrate the loop 14 having a relatively u-shaped body with inward projections that engage openings in the outer surface of the bushing 20. The metal loop 14 may be employed to attach a keyring 15 thereto. Further, the loop 14 and the bushing 20 are secured relative to one another. Accordingly, as the bushing 20 rotates, the metal loop 14 rotates as well. FIG. 10 illustrates the retaining member or screw 78 extending through an annular opening in the busing 20 to secure the roller element 38 relative to the housing 12 at the second end of the device. In addition, as noted, the bushing 20 may be employed to retain a key ring 15 to the portable device 10 via the metal loop 14.

Returning to FIG. 1, in some configurations, the portable device 10 includes an exit opening 18 in the housing 12. In use, an empty packet may be removed through the exit opening 18 in the housing 12, after the packet has been discharged of its contents. The exit opening 18 also permits a user to clean at least a portion of the interior chamber 13 and the roller element 38.

As illustrated, in some configurations, the portable device 10 includes a housing 12 with a ketchup bottle-shaped profile. For example, the housing may have an elongate configuration with a cap on one end thereof. In some embodiments, several portions of the portable device 10, such as the housing 12 and/or the roller element 38 are comprised of a red-colored plastic resin. In other configurations, the housing 12 and/or roller element 38 may be comprised of differently colored materials, such as yellow, white, and peach, among a myriad of other shades.

In some configurations, the portable device 10 includes a metal loop 14 incorporated therein to permit the portable device 10 to selectively attach to a keyring 15. By some configurations, the rotatable cap 34, axle 42, collar element or bushing 20, metal loop 14 and keyring 15 are comprised of one or more metallic materials, such as aluminum, steel, nickel, aluminum, and/or brass, among other options.

As illustrated in FIG. 9, in at least some embodiments, the housing 12 is formed of two pieces including a front housing portion 60 and a rear housing portion 62. By one approach the housing pieces are injection molded plastic. During assembly, the front portion and rear portion 62 are typically secured together around the axle 42 and the roller element 38 via a plurality of screws 64.

Figure 13:
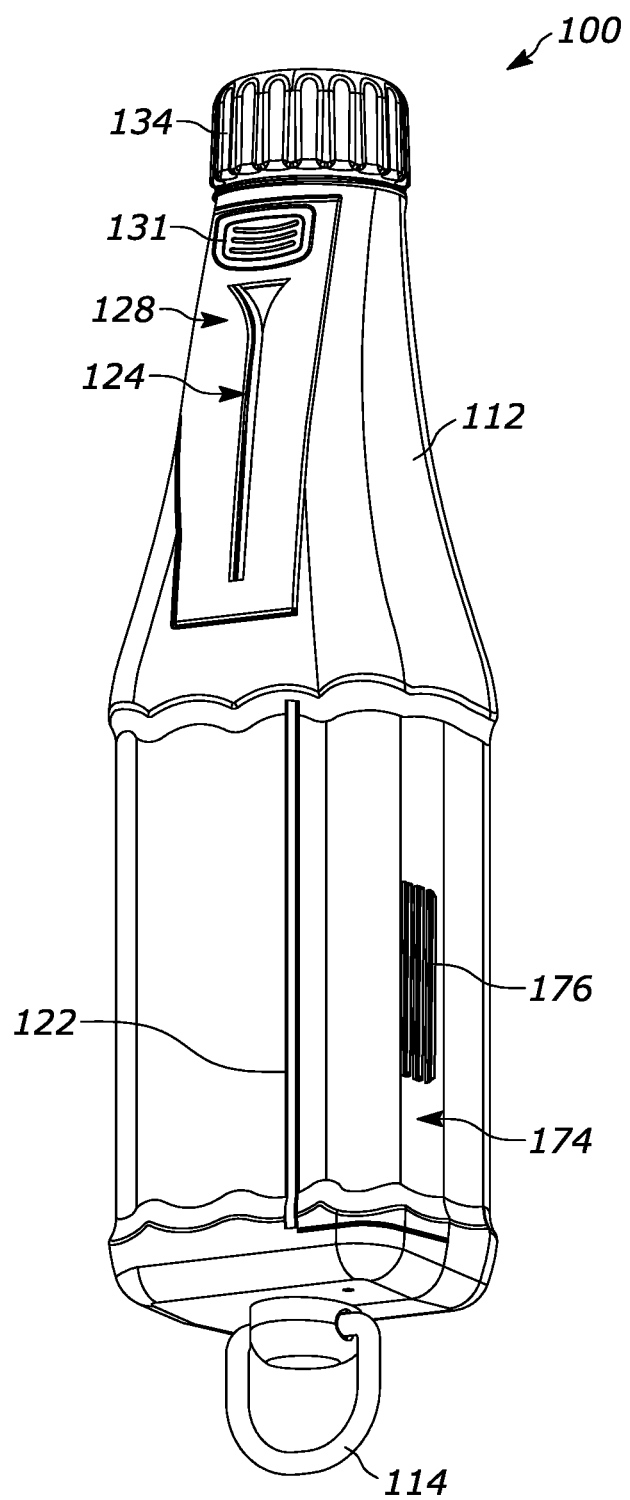
FIG. 13 comprises a perspective view of another embodiment.

In another embodiment, shown in FIG. 13, a portable device 100 includes a rotatable cap 134 configured to rotate a roller element within the housing 112, where a portion of the housing 112 includes a pressure bar 174 adjacent the slot 122. In one configuration, the pressure bar 174 comprises a corner portion of the housing 112. In some approaches, the pressure bar 174 is configured such that a user can manually press the pressure bar 174 toward the roller element and grasp an edge of a packet therebetween. Once a packet is pinched or clamped between the pressure bar 174 and the roller element, a user may rotate the roller element to pull the packet further into the housing 12 and squeeze or discharge the contents of the packet being pulled into the housing 12.

In some approaches, the pressure bar 174 further includes a gripping surface 176 of raised material or depressions so that a user may more easily manually grasp the pressure bar 174 to push it into engagement with the internal roller element. In one illustrative approach, the pressure bar 174 is spring loaded into position a small distance from the roller element such that a user may easily feed a portion of a packet between the pressure bar 174 and the internal roller element and then manually press the pressure bar 174 into engagement with the roller element and the packet. In addition, in other some examples, the roller element itself includes a textured surface to assist with gripping of an outside surface of the packet.

As shown, the portable device 100 also may include an opening mechanism with a slot 124, similar to that described above. While a previously described movable door or panel included a grasping ledge, the portable device 100 includes a textured gripping depression 131 that a user may push downward to disengage an upper portion of the movable panel or door 128 from a remainder of the housing 112. In addition, the portable device 100 may include a loop 114 similar to that described above.

As noted above, the portable devices described herein are usable for opening and dispensing the contents (e.g., condiments or sauces) from a packet, pouch, or sachet. In some configurations, a portable device 10 includes a housing 12 forming an interior chamber, a rotatable cap 34 disposed at a first end of the housing, a roller element 38 that is configured to rotate with manual rotation of the rotatable cap 34, a first slot 22 through a first housing wall through which a packet is configured to at least partially advance to the interior chamber, and a lengthwise slit 50 in the roller element. By some approaches, the lengthwise slit 50 is configured to receive an edge of a condiment packet that has been fed through the first slot 22 and retain the edge of the packet as the roller element 38 and the lengthwise slit are rotated around the axle. In such a manner, opposing sides of the condiment packet are pressed inward via sidewalls 52 of the first slot 22 in the housing 12, to thereby discharge or evacuate the condiment inside the packet when the packet is pulled at least partially through the first slot 22 in the housing 12.

In some further configurations, the portable device 10 further includes a second slot 24 in the housing permitting a corner of a packet to be fed therethrough and a knife or other cutting element 26 disposed at an end of the second slot to facilitate removal of the corner of the packet to thereby open the packet. In use, a consumer may insert a corner of the packet and slide the packet downward into engagement with the knife to remove the corner. Further, in some approaches, the second slot 24 is disposed on a movable door or panel 28 that opens to expose a refuse chamber 30 where the removed corners are collected. By adjusting the movable panel 28 to the open configuration, a user is thereby permitted to remove the corner of the packet that have collected in the interior of the housing 12.

In addition, in some configurations, the portable device 10 further includes an access, exit, or discharge opening 18 in a second wall 46 of the housing 12. The discharge opening 18 permits removal of packets that have been drawn or pulled into the chamber and discharged of their contents.

Figure 8:
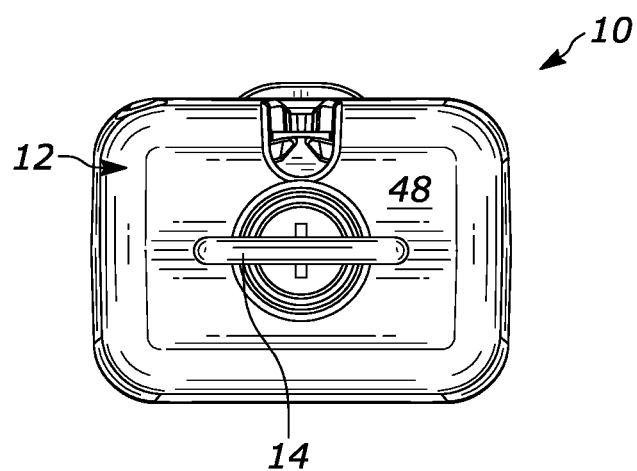
FIG. 8 comprises a bottom view of the embodiment of FIG. 1.

In use, a user may grasp an unopened condiment packet, feed a corner of the condiment packet into the second slot 24, and move the condiment packet toward a lower end of the second slot and into engagement with the knife 26 therein to remove the corner and open the packet. Subsequent to opening of the packet, the user may feed an edge of the opened packet (preferably opposite the open corner) through the first slot 22 and into engagement with the lengthwise slit 50 of the roller element 38. To assist with associating the packet with the lengthwise slit, a user may rely on an indication on the rotatable cap 34 or on a detent mechanism in the portable device 10 that provides the user a tactile indicate that the lengthwise slit 50 is aligned with the first slot 22. While a user may feed an edge of the packet through the first slot 22 via the first wall 44, a user also may pull an edge of the packet through the first slot 22 at the expanded opening section that extends to an end wall 48 (see, e.g., FIGS. 2 and 8). In this manner, the packet is pulled upward from the second end 15 toward the direction of the first end 5 as the edge is fed between the walls of the first slot 22 and the longitudinal slit 50.

Once the packet is engaged with the lengthwise slit 50, the user can rotate or twist the rotatable cap 34, which rotates the roller element 38 and proceeds to pull or draw the packet into the housing and further through the first slot 22. As the packet is pulled into the housing 12, sidewalls 52 of the slot 22 press on the sidewalls of the packet, thereby discharging or evacuating the contents of the packet. Once a packet has been substantially emptied, a user may, e.g., grasp a portion of the packet that has not been drawn into the housing to remove the packet through the first slot 22. Alternatively, a user may pull the emptied packet through the larger exit or discharge opening 18 in a rear or second wall 46 of the housing 12 (see, e.g., FIG. 4). In addition, to facilitate removal of the emptied packet, a user also may rotate the rotatable cap 34.

In addition, the user may manually press the graspable thumb tab 32 and press downward toward the second end 15 of the device to disengage the projection 30 from the corresponding openings in the housing 12 and expose the refuse chamber 30 to remove the separated corner of the packet that is disposed therein.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. For example, portions of one embodiment may be combined in whole or in part with another embodiment.

What is claimed:

1. A portable device for discharging product from a packet, the portable device comprising:
    a housing forming an interior chamber;
    a roller element at least partially disposed within the interior chamber and disposed lengthwise along the housing;
    a rotatable cap disposed at a first end of the housing, wherein manual rotation of the rotatable cap translates into rotation of the roller element;
    a first slot through a wall of the housing, the first slot adjacent the roller element and permitting a packet to ingress into the interior chamber through the first slot; and
    a second slot in the housing, the second slot sized to permit a corner of the packet to be fed through the second slot, such that the corner of the packet is removed from a remainder of the packet via a knife disposed at an end of the second slot;
    wherein the roller element further comprises a lengthwise slit therein that is sized to receive an edge of the packet and retain the edge of the packet in relation to the roller element as the roller element is rotated such that the packet is at least partially pulled into the interior chamber of the housing through the first slot such that opposing side edges of the packet are pressed toward one another via sidewalls of the first slot to thereby discharge contents of the packet.

2. The portable device of claim 1 wherein the rotatable cap includes indicia identifying where the lengthwise slit is located on the roller element to assist a user in aligning the lengthwise slit with the first slot and the rotatable cap further includes a textured peripheral surface that is configured to be grasped to rotate the rotatable cap and the roller element coupled thereto.

3. The portable device of claim 1 further comprising a bushing disposed on a second end of the housing and wherein the bushing is disposed outside of the housing and retained thereto via a screw disposed through an annular opening in the bushing.

4. The portable device of claim 3 further comprising an axle disposed along a length of the housing, wherein the axle is coupled to the rotatable cap at a first end thereof and the axle is coupled to the bushing via the roller element, such that the bushing and the rotatable cap rotate with the axle.

5. The portable device of claim 4 wherein the axle has a non-circular cross section and the roller element has a corresponding non-circular aperture disposed therethrough, the non-circular aperture disposed along an entire length of the roller element, thereby permitting the axle to extend therethrough such that the axle and the roller element are couple to one another in light of the fit between the non-circular cross section of the axle and the corresponding non-circular aperture of the roller element.

6. The portable device of claim 1 further comprising an exit opening in a rear wall of the housing, the exit opening configured to permit egress of the packet from the interior chamber.

7. The portable device of claim 1 wherein the lengthwise slit in the roller element further comprises an expanded slit end adjacent the second end of the portable device and the first slot further comprises an expanded slot end adjacent a second end of the portable device such that the first slot extends from the first wall of the housing over an edge of the housing and onto the second end.

8. The portable device of claim 1 further comprising at least one of a detent mechanism or a notch to align and retain the first slot with the lengthwise slit of the roller element.

9. The portable device of claim 1 wherein the roller element further includes a textured surface to assist with gripping of an outside surface of the packet.

10. The portable device of claim 1 wherein the housing has a ketchup bottle-shaped profile.

11. The portable device of claim 1 wherein the housing and the roller element are comprised of a red colored plastic resin.

12. The portable device of claim 1 further comprising a metal loop and keychain incorporated therewith to selectively attach to a keyring.

13. The portable device of claim 1 wherein the second slot is disposed on a movable panel that opens to expose a refuse chamber, wherein the movable panel includes the second slot and the knife that form a packet opening mechanism.

14. The portable device of claim 13 wherein the movable panel further comprises a gripping ledge at a first end thereof.

15. The portable device of claim 14 wherein the movable panel is hingedly attached to a remainder of the housing at a second end thereof opposing the gripping ledge, wherein the gripping ledge permits a user to manually adjust the movable compartment door outward from the housing to expose the refuse chamber.

16. The portable device of claim 15 wherein the first end further comprises a latch that selectively secures the movable panel to a remainder of the housing, wherein a user may manually grasp the gripping ledge to disconnect the latch and move the movable compartment door to expose the refuse chamber and remove any packet corner portions disposed therein.

17. The portable device of claim 15 wherein the movable panel is separable from a remainder of the housing, the movable panel comprising one or more extensions at a second end thereof, opposite the gripping ledge, wherein the one or more extensions mate within one or more corresponding openings in the housing.

18. The portable device of claim 1 further comprising a pressure bar adjacent the first slot, wherein the pressure bar comprises a corner portion of the housing, the pressure bar being configured to be manually pressed by a user to thereby move the pressure bar toward the roller element.

19. The portable device of claim 18 further comprising a textured gripping surface disposed on the pressure bar.

20. A portable device comprising:
    a housing forming an interior chamber;
    an axle extending a length of the housing;
    a rotatable cap disposed at a first end of the housing, the rotatable cap coupled to the axle;
    a roller element coupled to the axle, the roller element configured to rotate with manual rotation of the rotatable cap;

a bushing disposed at a second end of the housing, the bushing rotatably coupled to the axle;

a first slot through a first housing wall, the first slot configured to permit a packet to at least partially ingress to the interior chamber;

a lengthwise slit in the roller element, the lengthwise slit configured to receive an edge of the packet and retain the edge as the roller element and the lengthwise slit are rotated around the axle, wherein sides of the packet are pressed inward via sidewalls of the first slot in the housing, to thereby discharge contents of the packet when the packet is pulled at least partially through the first slot in the housing wall;

a second slot in the housing permitting a corner of the packet to be fed into a refuse chamber; and a knife element disposed at an end of the second slot to facilitate removal of the corner of the packet to thereby open the packet;

wherein the second slot is disposed on a movable panel that opens to expose the refuse chamber, thereby permitting removal of the corner of the packet from the refuse chamber of the housing.

21. The portable device of claim 20 further comprising a discharge opening in a second housing wall, the discharge opening permitting removal of evacuated packets.

* * * * *